United States Patent [19]

Quick et al.

[11] Patent Number: 5,484,043
[45] Date of Patent: Jan. 16, 1996

[54] SPEED RESPONSIVE BRAKE DEVICE

[75] Inventors: David C. Quick; David E. Russ, both of Rockford, Ill.

[73] Assignee: Sundstrand Corporation, Rockford, Ill.

[21] Appl. No.: 54,682

[22] Filed: Apr. 28, 1993

[51] Int. Cl.⁶ .................................................... F16D 15/00
[52] U.S. Cl. .................................................................. 188/187
[58] Field of Search ................................. 188/180, 187, 188/166, 163; 74/89.15

[56] References Cited

U.S. PATENT DOCUMENTS

| | | | |
|---|---|---|---|
| 2,362,676 | 11/1944 | Stechbart | 188/187 |
| 2,951,540 | 9/1960 | Hawkins | 188/187 |
| 4,318,304 | 3/1982 | Lang | 74/89.15 |
| 4,603,594 | 8/1986 | Grimm | 74/89.15 |
| 4,685,550 | 8/1987 | Metcalf | 192/67 |
| 4,987,788 | 1/1991 | Bausch | 74/89.15 |
| 5,137,126 | 8/1992 | Magnaval et al. | 188/187 |

FOREIGN PATENT DOCUMENTS

| | | | |
|---|---|---|---|
| 182113 | 4/1936 | Germany | 188/187 |

*Primary Examiner*—Matthew C. Graham
*Attorney, Agent, or Firm*—Wood, Phillips, VanSanten, Hoffman & Ertel

[57] ABSTRACT

In order to prevent serious damage to a flight control system in a failure mode, a failure protection unit includes an input shaft connected to a shaft of the flight control system with the input shaft normally being operably associated with a plunger having a brake hub integral therewith for rotational driven movement of the plunger and the brake hub through the input shaft. The plunger and the brake hub are movable relative to the input shaft, and a brake reaction plate is positioned within a housing in normally spaced relation to the brake hub. The brake hub is biased by a spring in a direction toward the brake reaction plate and the plunger is biased by the spring in a direction away from the input shaft. The plunger is normally locked against movement by a detent which resists movement of the plunger away from the input shaft and movement of the brake hub toward the brake reaction plate. With these features of construction, a trip mechanism initiates engagement of the brake hub with the brake reaction plate responsive to an overspeed condition for the shaft of the flight control system by disabling the detent to thereby allow the spring to cause movement of the brake hub toward the brake reaction plate and movement of the plunger away from the input shaft.

27 Claims, 4 Drawing Sheets

FIG.6

SPEED RESPONSIVE BRAKE DEVICE

FIELD OF THE INVENTION

The present invention generally is related to flight control systems and, more particularly, a failure protection unit for a flight control system.

BACKGROUND OF THE INVENTION

In the case of aircraft, the drive system for the leading edge flaps is known to require a failure protection unit at each wing tip. This failure protection unit, which is sometimes called an asymmetry brake, is needed to stop rotation of the drive system in the event of a drive failure. As is also known, the failure protection unit must not engage during normal operation but must engage rapidly in the event of a shaft overspeed condition.

Generally speaking, it is known that the leading edge flaps on aircraft are basically quite unstable in nature. The wings, of which they form a part, are also known to be quite thin which means that there is a small envelope for positioning a failure protection unit. Moreover, it is known that typical air loads may cause a leading edge flap to be driven out of position quite rapidly.

In order to be acceptable, a failure protection unit must satisfactorily deal with all of these problems. It is also a typical requirement to be able to engage a failure protection unit, or asymmetry brake, in response to an electrical signal received from the flight computer. However, in any case, the dynamic torque during lockup must not exceed the shaft torque capacity.

From the foregoing, it will be appreciated that the primary requirements for a failure protection unit are rather well known. The unit must engage rapidly in the event of shaft overspeed, or in response to an electrical signal. There must also be an avoidance of inadvertent trips and the failure protection unit must therefore be insensitive to normal shaft acceleration. The unit must also limit shaft torque during engagement, and be easily resettable by ground maintenance personnel. Unfortunately, the failure protection units that have heretofore been available are less than entirely satisfactory.

The present invention is directed to overcoming one or more of the foregoing problems and achieving one or more of the resulting objects.

SUMMARY OF THE INVENTION

It is therefore a principal object of the present invention to provide a compact failure protection unit for a flight control system. It is a further object of the present invention to provide such a unit which is capable of rapid engagement due to shaft overspeed or in response to an electrical signal from the flight computer wherein the unit avoids inadvertent trips and is insensitive to normal shaft acceleration. It is an additional object of the present invention to limit shaft torque during engagement with a unit that is easily resettable.

Accordingly, the present invention is directed to a failure protection unit for a flight control system which includes an input shaft connected to a shaft of the flight control system. The unit is formed such that the input shaft is normally operably associated with a plunger having a brake hub integral therewith. Rotational driven movement is imparted to the plunger and the brake hub through the input shaft. The unit is also formed such that the plunger and the brake hub are moveable together relative to the input shaft. Still additionally, the unit includes a brake reaction plate which is suitably stationary and positioned within a housing in normally spaced relation to the brake hub.

With these features, the unit will be understood to include spring means suitably arranged for biasing the brake hub in a direction toward the brake reaction plate and for biasing the plunger in a direction away from the input shaft. Also, means are provided for normally resisting movement of the brake hub toward the brake reaction plate and movement of the plunger away from the input shaft, and the unit includes trip means for initiating engagement of the brake hub with the brake reaction plate responsive to an overspeed condition for the shaft of the flight control system. In this connection, the trip means operates by disabling the movement resisting means to thereby allow the spring biasing means to cause movement of the brake hub toward the brake reaction plate and movement of the plunger away from the input shaft.

In the exemplary embodiment, the brake reaction plate is mounted to be normally stationary within the housing and in normally axially spaced relation to the brake hub. It is also advantageous for the spring means to bias the brake hub in a direction axially toward the brake reaction plate and the plunger in a direction axially away from the input shaft. With this arrangement, the movement resisting means normally resists axial movement of the brake hub toward the brake reaction plate and axial movement of the plunger away from the input shaft.

More specifically, the movement resisting means preferably comprises detent means including a plurality of detent balls. The detent balls are normally partially disposed in a ball-containing recess in the plunger and partially in an axially fixed sleeve. In this manner, it will be appreciated that the detent balls serve to lock the plunger against axial movement relative to the housing.

In addition, it will be understood that the trip means serves to initiate axial engagement of the brake hub with the brake reaction plate. The trip means advantageously includes centrifugal response means operably associated with the movement resisting means or detent means. In this connection, the centrifugal response means preferably comprises a flyball mechanism which is positioned radially outwardly of the plunger.

In a highly preferred embodiment, the flyball mechanism has a plurality of radial pockets defined by a driving plate rotationally driven by the input shaft. It also advantageously includes a spring biased output plate which is normally rotationally driven by a ball that is confined in each of the pockets defined by the driving plate. Still further, the flyball mechanism preferably includes an axial sleeve disposed about the plunger and the output plate extends generally radially of this sleeve.

With this arrangement, the output plate preferably includes a ramped or angled surface at the radial outward extreme thereof and a flyball spring is disposed about the plunger to act axially against the axial sleeve for biasing the output plate axially toward the driving plate. Still further, the axial sleeve preferably has a ball-receiving recess in an inner surface thereof confronting the plunger and normally axially offset from the balls of the detent means whereby the balls of the detent means are normally maintained in the ball-containing recess in the plunger and the axially fixed sleeve.

As for other details, the unit preferably includes means for resetting the brake hub in normally axially spaced relation to the brake reaction plate.

Still additionally, the brake reaction plate advantageously includes an elastomeric shock absorbing means which is operably associated therewith. The unit also suitably includes solenoid means for initiating engagement of the brake hub with the brake reaction plate. Further, sensing means may be provided for indicating when the brake hub has become engaged with the brake reaction plate by action of the trip means or the solenoid means.

As for still other details, the brake hub and the brake reaction plate preferably are formed such that each of them have a plurality of teeth disposed in generally confronting relation for positive engagement thereof. These teeth advantageously are formed to have a negative rake. Furthermore, the elastomeric shock absorbing means is preferably integrally associated with the brake reaction plate in engagement with the housing to cushion engagement and cause deceleration to a controlled stop.

Other objects, advantages and features of the present invention will become apparent from a consideration of the following specification taken in conjunction with the accompanying drawings.

DETAILED DESCRIPTION OF THE PREFERRED EMBODIMENT

Figure 1:
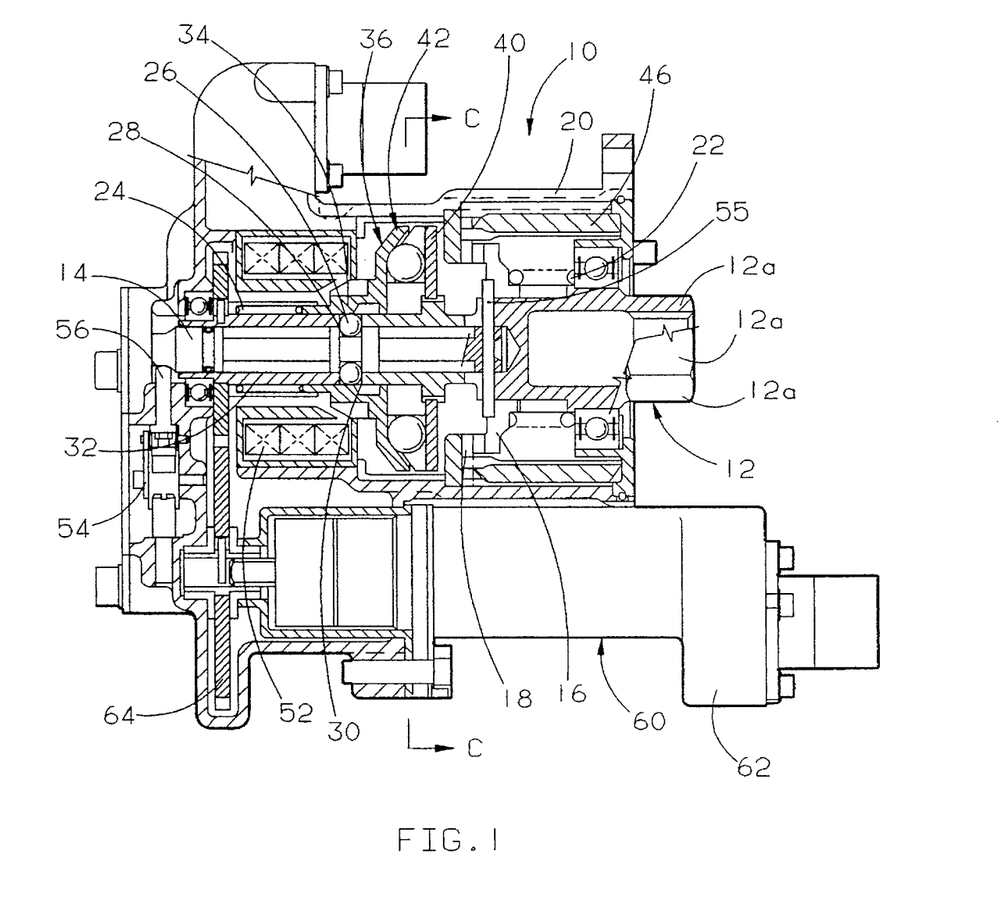
FIG. 1 is a cross sectional view illustrating a failure protection unit for a flight control system in accordance with the present invention.

In the illustrations given, and with reference first to FIG. 1, the reference numeral 10 designates generally a failure protection unit for a flight control system in accordance with the present invention including rotary input means in the form of an input shaft 12 connected so as to be operatively associated with a shaft of a flight control system (not shown). The unit 10 is formed such that the input shaft 12 is normally operably associated with rotary brake means including a plunger 14 having a brake hub 16 integral therewith for rotational driven movement of the plunger 14 and the brake hub 16 through the input shaft 12. The plunger 14 and brake hub 16 will also be understood to be axially moveable relative to the input shaft 12. The unit 10 is also formed to include a brake means which will be seen and understood to comprise a brake reaction plate 18 which is suitably positioned within a housing 20 and mounted in such a manner as to be normally stationary in normally axially spaced relation to the brake hub 16. With this understanding of the invention, the unit 10 further includes means such as a spring 22 for biasing the brake hub 16 in a direction axially toward the brake reaction plate 18 and means such as a detent ball 26 located in a ball containing recess 30 which serves to normally resist movement of the brake hub 16 in a direction axially toward the brake reaction plate 18.

More specifically, the spring 22 biases both the brake hub 16 and the plunger 14 in a direction axially away from the input shaft 12. It will also be seen that the spring 24 normally resists movement of the brake hub 16 and the plunger 14 axially away from the input shaft 12, i.e., the springs 22 and 24 have spring reaction forces acting in axially opposite directions with the spring 22 exerting a greater force to cause rapid engagement of the brake means when necessary. However, as will be appreciated, movement of the brake hub 16 is also normally resisted by detent means including a plurality of detent balls 26.

Figure 2:
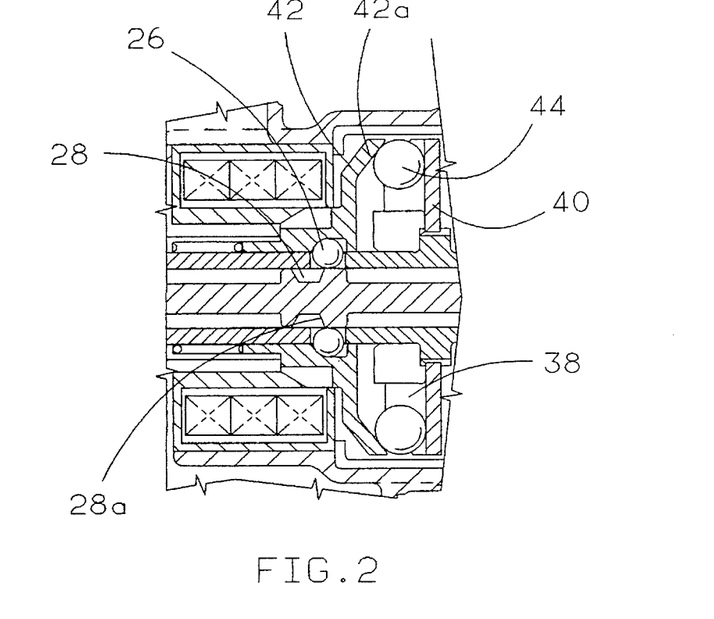
FIG. 2 is an enlarged cross sectional view of a portion of FIG. 1 illustrating a centrifugal flyball mechanism of the failure protection unit.

Referring to FIGS. 1 and 2, the balls 26 are preferably normally partially disposed in a ball-containing recess 28 in the plunger 14 for locking the plunger 14 relative to the housing 20. It will also be seen and appreciated that the balls 26 are normally at least partially disposed in a ball-containing recess 30 in an axially fixed sleeve 32 which is provided intermediate the plunger 14 and an axial sleeve 34 of a flyball mechanism generally designated 36. In this connection, the ball containing recess 30 of the axially fixed sleeve 32 is normally in alignment with the ball-containing recess 28 in the plunger 14 when the plunger 14 is in a locked position.

Still referring to FIGS. 1 and 2, the unit 10 includes centrifugal force responsive trip means for initiating an axial engagement of the brake hub 16 with the brake reaction plate 18 responsive to an overspeed condition for the shaft of the flight control system. This is accomplished when the tome of the spring 24 is overcome and the bails 26 are displaced from the bail-containing recess 28 to thereby disable the movement resisting means to allow the heavier spring 22 to cause rapid axial movement of the brake hub 16 toward the brake reaction plate 18 and axial movement of the plunger 14 away from the input shaft 12. In this manner, it will be understood and appreciated that the brake hub 16 can be brought into engagement with the brake reaction plate 18 in response to centrifugal force as will be described in greater detail hereinafter.

As previously suggested, the flyball mechanism which has been generally designated 36 comprises a centrifugal force responsive means which is positioned radially outwardly of the plunger 14. It includes a plurality of radial pockets 38 (see FIG. 3) which are defined by a driving plate 40 (see FIG. 2) that is rotationally driven by the input shaft 12, and it also includes a spring biased output plate 42 normally rotationally driven by a bail 44 confined in each of the pockets 38 defined by the driving plate 40. Still additionally, the flyball mechanism 36 includes the axial sleeve 34 which is disposed about the plunger 14, and the output plate 42 extends integral with and generally radially of the sleeve 34.

Figure 4A:
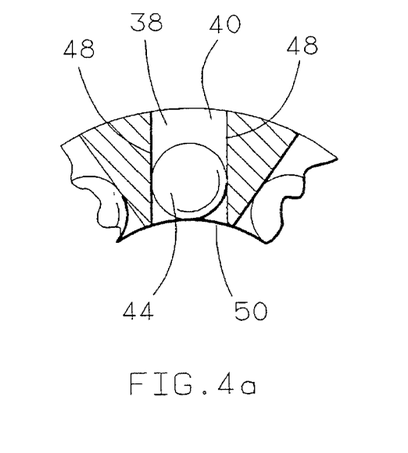
FIG. 4a is an enlarged cross sectional view of a portion of FIG. 3 illustrating a ball in a pocket of a driving plate of the centrifugal flyball mechanism.
Figure 4B:
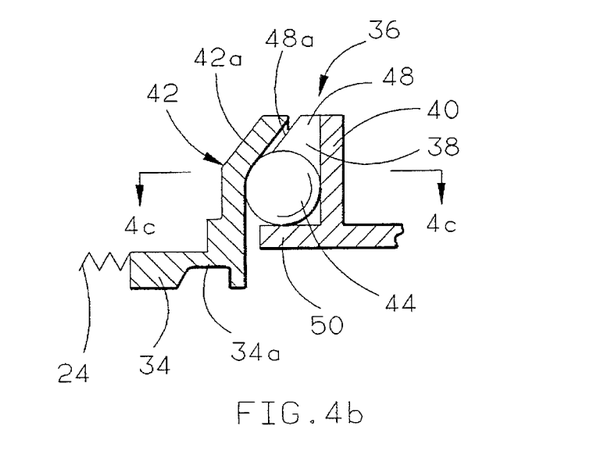
FIG. 4b is an enlarged cross sectional view of a portion of FIG. 2 illustrating a ball in a pocket of a driving plate of the centrifugal flyball mechanism.

Referring to FIGS. 1, 2 and 4b, the output plate 42 will be seen to include a ramped or angled surface 42a which defines a frustoconical structure at the radial outward extreme thereof. It will also be seen that the spring 24, which may be described as a flyball spring, is disposed about the plunger 14 to act axially against the axial sleeve 34 for biasing the output plate 42 and, thus, the frustoconical, ramped structure, axially toward the driving plate 40. As will also be appreciated, the axial sleeve 34 has a ball-receiving recess 34a in an inner surface thereof confronting the plunger 14 which is normally axially offset from the balls 26 of the detent means.

With this arrangement, It will be appreciated that the detent balls 26 are normally maintained in the ball-containing recesses 28 and 30 in the plunger 14 and axially fixed sleeve 32, respectively, to lock the plunger 14 and brake hub 16 against axial movement. It will be appreciated from comparing FIGS. 1 and 2, however, that movement of the output plate 42 of the flyball mechanism 46 in a direction axially away from the input shaft 12 will cause the ball-receiving recess 34a in the axial sleeve 34 to come into alignment with the ball-containing recess 30 in the axial fixed sleeve 32. When this occurs, the spring 22 is exerting a strong force on the plunger 14 that causes the angled surface 28a of the ball-containing recess 28 to force the balls 26 out of the ball-containing recess 28 in the plunger 14 so as to be disposed entirely in the ball-containing recess 30 and the ball-receiving recess 34a.

When this occurs, the detent means no longer resists axial movement of the brake hub 16 and the plunger 14 and, thus, the plunger 14 is no longer locked relative to the housing 20. On the contrary, the plunger 14 and brake hub 16 move in a direction axially away from the input shaft 12 until the brake hub 16 is in engagement with the brake reaction plate 18.

Figure 5:
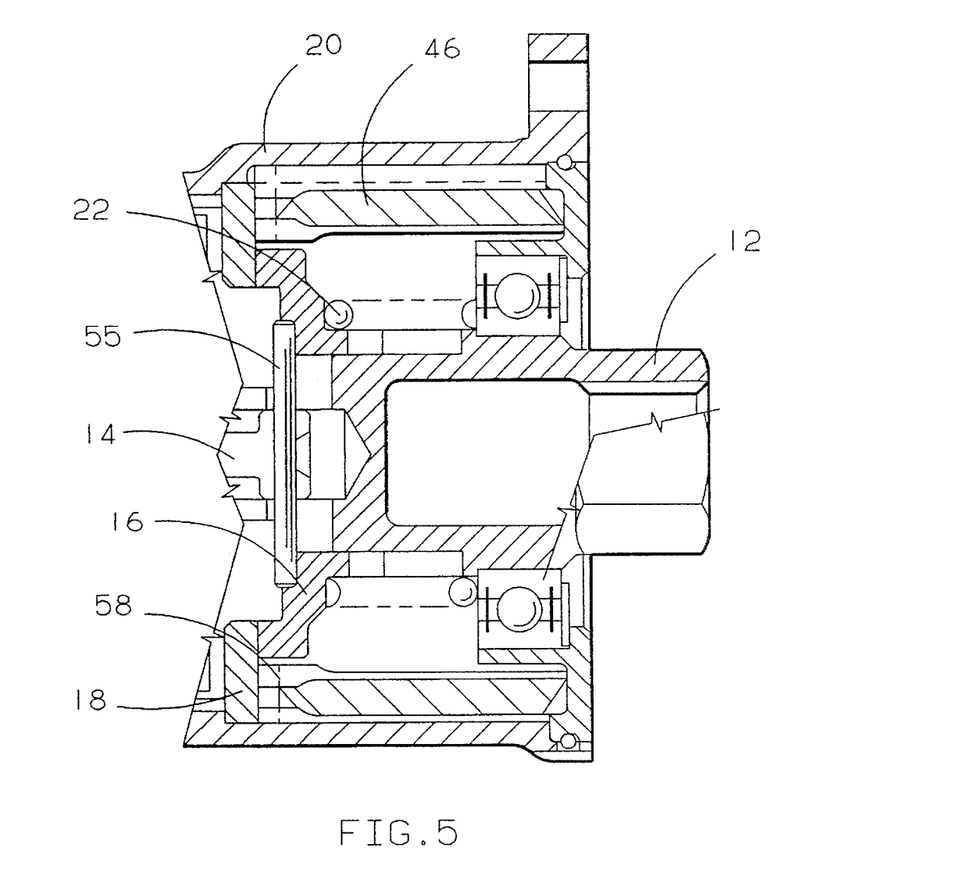
FIG. 5 is an enlarged cross sectional view of a portion of FIG. 1 illustrating an elastomeric shock absorber integral with a brake reaction plate.
Figure 6:
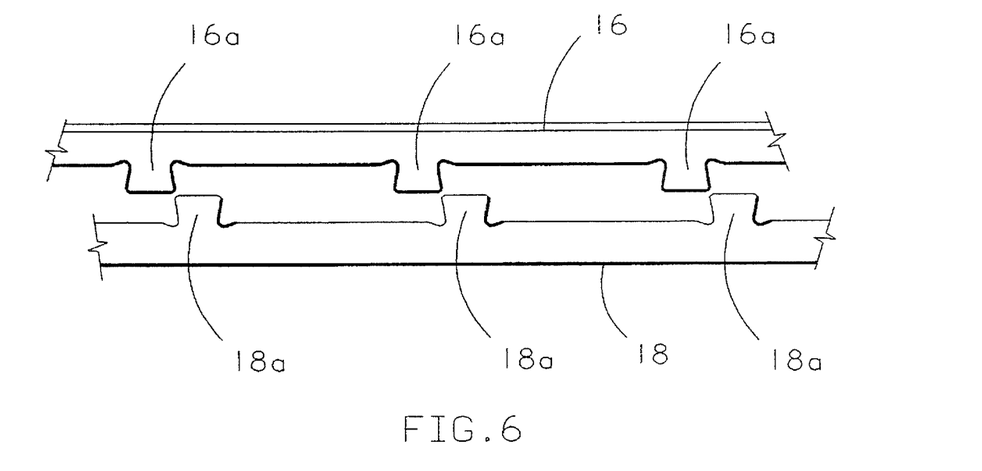
FIG. 6 is a cross sectional view illustrating engagement of a brake hub and a brake reaction plate in accordance with the present invention.

Referring to FIGS. 5 and 6, the brake hub 16 and the brake reaction plate 18 each have a plurality of jaw teeth 16a and 18a, respectively, which have a negative rake and are disposed in confronting relation for positive engagement thereof. In addition, the brake reaction plate 18 includes an elastomeric torsional shock absorber integrally associated with the brake reaction plate 18 and in engagement with the housing 20 to cushion brake engagement and cause deceleration to a controlled stop.

Figure 4C:
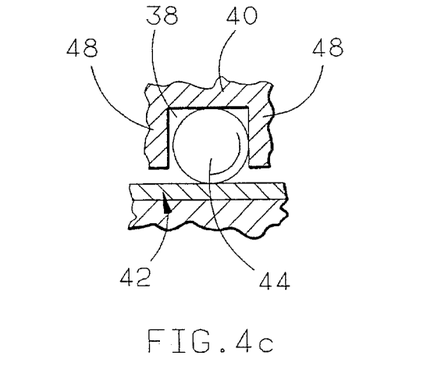
FIG. 4c is a cross sectional view taken on the line 4c—4c of FIG. 4b illustrating a ball in a pocket of a driving plate of the centrifugal flyball mechanism.

Referring specifically to FIG. 4b, the output plate 42 extends generally radially of the axial sleeve 34 with its ramped surface 42a at the radial outward extreme thereof. It will be fully appreciated, as previously suggested, that the flyball spring 24 is disposed about the plunger 14 (see, also, FIGS. 1 and 2) to act against the axial sleeve 34 for biasing the output plate 42 toward the driving plate 40. The pockets 38 are further defined by a plurality of generally radial walls 48 integral with the driving plate 40 (see, also, FIGS. 4a and 4c). It will be understood, as described below, that the pockets 38 are still further defined by a circumferential wall 50 at the radial innermost extent thereof. As best shown in FIGS. 4a through 4c, the radial walls 48 for each of the pockets 38 are generally parallel and are also generally coextensive and integral with the circumferential wall 50.

Referring now to FIG. 4b, it will be seen that the radial walls 48 are each formed so as to include an angled surface 48a at the radial outward extreme of the wall. The ramped surface 42a of the output plate 42 is generally parallel to and coextensive with the angled surfaces 48a of the radial walls 48. Additionally, the ramped surface 42a of the output plate 42 and the angled surface 48a of the radial walls 48 extend away from the axial sleeve 34 and generally toward the driving plate 40.

As best shown in FIGS. 1 and 2, the detent means includes means normally biasing the balls 26 in a radially outward direction, i.e., generally perpendicular to the axis of the plunger 14. This preferably comprises the angled surface 28a of the ball-containing recess 28, as previously described, in combination with the force of the spring 22 which biases the brake hub 16 and the plunger 14 in a direction toward the brake reaction plate 18 and away from the input shaft 12, respectively, such that the balls 26 are normally forced into engagement with an inner surface of the axial sleeve 34 (see FIG. 1). As previously discussed, the balls 26 are forced into the ball-receiving recess 34a of the axial sleeve 34 when the axial sleeve 34 acts against the flyball spring 24 to move axially.

From the foregoing, it will be appreciated that the failure protection unit 10 of the present invention comprises a brake assembly which is suitably located at the outboard end of a flight control system. This flight control system, which may be a leading edge flap deployment system, is protected by the failure protection unit from asymmetry and other potential leading edge flap system failure modes. While not specifically shown, the failure protection unit 10 is interchangeable for left and right hand installation and operates through an interconnection to a shaft of the flight control system.

With the failure protection unit 10, the centrifugal flyball trip mechanism 36 is adapted to initiate brake engagement in the event of a overspeed in excess of design conditions. The trip point can be set to occur within a range, e.g., of between approximately 2200 and 3100 rpm which might correspond to 150% to 210% of the maximum no-load leading edge flap rate of 30° per second. In this connection, the flyballs 44 travel radially outward from the centerline of the input shaft 12 and the plunger 14 due to centrifugal force when the trip speed is reached.

When this occurs, the ramped surface 42a causes the output plate 42 to move axially against the preloaded spring 24 which releases the detent balls 26 from locking the plunger 14. The heavier spring 22 then slides the plunger 14 and the brake hub 16 axially to thereby cause the rotating brake hub 16 to engage the non-rotating brake reaction plate 18. As previously mentioned, the brake reaction plate 18 is attached to an elastomeric torsional shock absorber 46 which acts against the housing 20 to decelerate the brake hub 16 to a controlled stop.

In the preferred embodiment, the failure protection unit 10 is also equipped with a triplex coil solenoid 52 to initiate brake engagement. When the solenoid 52 is energized by the flight computer, the solenoid 52 pulls the output plate 42 to release the detent balls 26 from locking the plunger 14. The brake is thereafter engaged in the same manner as with the normal operation of the centrifugal flyball mechanism 36.

The failure protection unit 10 may also include a position sensor driven by a set of spur gears from the input shaft to sense the position of the leading edge flap system. Also, an electrical sensor or switch 54 is included as part of the assembly to provide an electrical indication to verify when the brake is engaged. As shown in FIG. 1, the switch 54 will be activated by reason of axial movement of the plunger 14 in a direction away from the input shaft 12.

As for other details, the failure protection unit 10 advantageously includes means for resetting the brake hub 16 in normally axially spaced relation to the brake reaction plate 18. This is preferably accomplished by manually depressing the plunger 14 which protrudes outwardly of the end of the failure protection unit 10 when the brake is engaged. Any torque that is locked in the leading edge flap system/failure protection unit must first be relieved and, for this purpose, wrench flats 12a are provided on the input shaft 12. Depressing the plunger 14 against the force of the brake spring 22 slides the brake hub 16 out of engagement with the brake reaction plate 18. This allows the locking detent balls 26 to simultaneously drop into a locking position in the ball-containing recess 28 in the plunger 14. Also, the spring 24 will cause the output plate 42 to be forced back to its original position thereby confining and retaining the locking detent balls 26 and resetting the centrifugal flyball mechanism 36.

Figure 3:
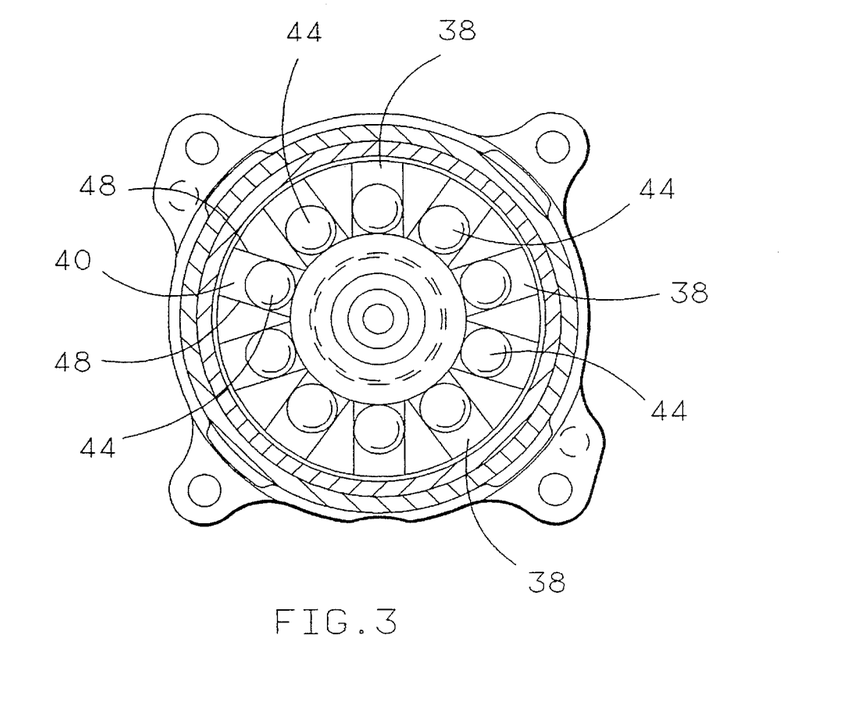
FIG. 3 is an enlarged cross sectional view taken on the line 3—3 of FIG. 1 illustrating a flyball driving plate of the failure protection unit.

From the foregoing, it will be appreciated that the centrifugal flyball mechanism 36 is used to sense shaft RPM and initiate a brake engagement when the speed exceeds a predetermined value. FIG. 3 illustrates ten balls 44 contained in ten corresponding radial slots 38 in the driving plate 40 which is driven by the input shaft 12 through the brake hub 16 and the plunger 14 that are joined through the blocking pin 55. FIG. 4b illustrates that the ramped surface 42a of the output plate 42 is spring loaded against the balls 44 such that shaft rotation causes the balls 44 to be forced centrifugally against the output plate 42 tending to slide the plate axially in a direction away from the input shaft 12. When the centrifugal force exceeds the spring force, it will be seen and appreciated that the output plate 42 will slide axially so as to again release the detent balls 26 from their locking position.

By using a proper combination of spring 24, ramp angle 42, and mass of balls 44, snap action can be achieved as the balls 44 travel outwardly.

Referring to FIGS. 4a through 4c, high angular acceleration tending to accelerate the balls 44 causes a significant force between the pockets 38 and individual balls 44 at point C. The shape of the pockets 38 ensures that the force on the balls 44 will be in a tangential direction so the acceleration will not cause any axial or radial force to be reacted by the driven output plate 42. As a result, there is no tendency to either cause or retard a brake trip, and the brake trip speed will be entirely dependent upon the centrifugal or radial force of the balls 44 due to shaft speed.

In this connection, frictional force at point C will not inhibit outward ball travel because the ball is free to roll up the ball pocket while sliding at the points of contact with the driving and output plates 40 and 42, respectively. Sliding friction also occurs between the detent balls 26 and the output plate 42 as well as at points A and B on the centrifugal balls 44. As will be seen, the direction of centrifugal force and sliding force has been shown in FIGS. 4a through 4c. Referring to FIG. 1, the flyball output plate 42, the locking detent balls 26, the plunger 14, the blocking pin 55 and the springs 22 and 24 may collectively be considered to comprise a trigger mechanism.

In the normal operating position, the flyball output plate 42 is maintained closely adjacent the driving plate 40 by the spring 24. This causes the locking detent balls 26 to be retained in the locked, or cocked, position in the ball containing recess or groove 28 in the plunger 14 thereby locking the plunger 14 from moving axially which, in turn, retains the brake hub 16 in the disengaged position. Because of this unique arrangement, shock loads, acceleration and/or vibration will not have any tendency to inadvertently engage the brake.

When the flyball output plate 42 is moved axially, either by the solenoid 52 or the centrifugal flyballs 44, the locking detent balls 26 will be released. This means that the detent balls 26 will be forced outward into the ball receiving relief or recess in the axial sleeve portion 34 of the output plate 42 by the force of the brake hub spring 22 on the plunger 14. As this occurs, the brake hub spring 22 will cause the brake hub 16 to be driven into engagement with the stationary brake reaction plate 18.

As for the brake sensor or switch 54, it is provided to verify brake engagement. The switch 54 is closed by the motion of the plunger 14 when the brake hub 16 translates to engage the brake reaction plate 18. A switch pin 56 is displaced radially by a cam surface on the plunger 14 as it slides axially to operate the switch. The switch remains "on" until the brake is reset which automatically resets the switch 54. As shown in FIG. 1, the switch 54 is enclosed for protection from external damage.

Referring to FIGS. 5 and 6, it will be seen and appreciated that the brake preferably comprises a sliding jaw brake with face teeth 16a, 18a and an elastomeric torsional shock absorber 46.

When the detent balls 26 are released either directly by the centrifugal flyball mechanism 36 or indirectly by the solenoid 52, the brake hub spring 22 translates the rotating brake hub 16 axially into engagement with the non-rotating brake reaction plate 18. Six teeth 16a and 18a are utilized in the preferred embodiment on each of the brake hub 16 and the brake reaction plate 18, and they are designed with a negative rake for positive engagement so as to cause the brake hub 16 to be pulled into locking engagement with the brake reaction plate 18 by the applied torque. By using six teeth, a "window" is provided to allow the brake hub 16 sufficient time to achieve full engagement while rotating at or above the trip speed, and a heavy spring and cam action drive feature provide for rapid positive engagement.

As for the elastomeric torsional shock absorber 46, it is provided to cushion brake engagement and to decelerate the system to a controlled stop. There may also be provided fail-safe mechanical secondary stops 58, which are shown engaged in FIG. 5, but the elastomeric torsional shock absorber 46 has been chosen for its light weight and favorable configuration to fit within a confined envelope. In this connection, it will be appreciated that elastomeric torsional shock absorbers have proven highly reliable in many similar applications in the past.

Referring once again to FIG. 1, a position sensor generally designated 60 contains a triplex RVT 62 and gearhead 64 mounted in series. The RVT stators and rotors are protected from external loads by the cover of the position sensor 60 which also serves as the mounting structure for an electrical connector. As shown, the position sensor 60 is mounted to the housing 20 in such manner as to lie generally parallel to its major axis.

In the field of the invention, it is known that two paramount concerns must be addressed in the design of any asymmetry brake. One is potential inadvertent trips and the other is the need for utmost functional reliability. As for the first mentioned problem, inadvertent trips can be caused by shock loads, vibration, or angular acceleration.

With the present invention, the centrifugal flyball mechanism 36 has been specifically designed to minimize the effect of these loads. By placing the balls 44 in radial pockets 38 in the driving plate 40, high angular acceleration loads on the balls 44 will not produce any axial or radial force which would tend to cause an inadvertent trip. In addition, vertical shock loads have a relatively minor effect on ball loading compared to the ball "g" loads required for a centrifugal trip.

Still further, the arrangement of the balls 44 is such that the effects of the shock loads on the balls 44 above and below the center line are not additive. Thus, this negates any effect on centrifugal trip, and the effect of lateral shock loads is also minimal. As for the effect of longitudinal shock, it will be understood to be minor and will affect the trip speed by less than about 5%.

As will be appreciated, substantial axial motion of the flyball output plate 42 is required to cause a brake trip with the present invention. Thus, the amplitude of potential vibration induced motion is too small to affect the trip point. In addition, the brake hub 16 is locked in the disengaged position so external loads cannot cause inadvertent engagement of the brake teeth 16a, 18a.

While in the foregoing there has been set forth a preferred embodiment of the invention, it will be appreciated that the details herein given may be varied by those skilled in the art without departing from the true spirit and scope of the appended claims.

We claim:

1. A failure protection unit for a flight control system, comprising:

an input shaft connected to a shaft of said flight control system, said shaft of said flight control system normally being operably associated with a plunger having a brake hub integral therewith for rotational driven movement of said plunger and said brake hub through said input shaft, said plunger and said brake hub being moveable relative to said input shaft;

a brake reaction plate positioned within a housing in normally spaced relation to said brake hub;

spring means biasing said brake hub in a direction toward said brake reaction plate and said plunger in a direction away from said input shaft;

means normally resisting movement of said brake hub toward said brake reaction plate and movement of said plunger away from said input shaft; and trip means for initiating engagement of said brake hub with said brake reaction plate responsive to an overspeed condition for said shaft of said flight control system by disabling said movement resisting means to thereby allow said spring biasing means to cause movement of said brake hub toward said brake reaction plate and movement of said plunger away from said input shaft.

2. The failure protection unit of claim 1 wherein said movement resisting means includes detent means normally locking said plunger relative to said housing.

3. The failure protection unit of claim 1 wherein said trip means includes centrifugal response means operably associated with said movement resisting means.

4. The failure protection unit of claim 1 wherein said brake reaction plate includes elastomeric shock absorbing means operably associated therewith.

5. The failure protection unit of claim 1 including solenoid means for initiating engagement of said brake hub with said brake reaction plate.

6. The failure protection unit of claim 1 including sensing means for indicating engagement of said brake hub with said brake reaction plate.

7. The failure protection unit of claim 1 including means for resetting said brake hub in normally spaced relation to said brake reaction plate.

8. A failure protection unit for a flight control system, comprising:

an input shaft connected to a shaft of said flight control system, said shaft of said flight control system normally being operably associated with a plunger having a brake hub integral therewith for rotational driven movement of said plunger and said brake hub through said input shaft, said plunger and said brake hub being axially moveable relative to said input shaft;

a brake reaction plate mounted to be normally stationary within a housing in normally axially spaced relation to said brake hub;

spring means biasing said brake hub in a direction axially toward said brake reaction plate and said plunger in a direction axially away from said input shaft;

means normally resisting movement of said brake hub axially toward said brake reaction plate and movement of said plunger axially away from said input shaft including detent means normally axially locking said plunger relative to said housing;

trip means for initiating axial engagement of said brake hub with said brake reaction plate, said trip means being responsive to an overspeed condition for said shaft of said flight control system to disable said movement resisting means to thereby allow said spring biasing means to cause axial movement of said brake hub toward said brake reaction plate and axial movement of said plunger away from said input shaft, said trip means including centrifugal response means operably associated with said movement resisting means; and means for axially resetting said brake hub in normal axially spaced relation to said brake reaction plate.

9. The failure protection unit of claim 8 wherein said brake reaction plate includes elastomeric shock absorbing means operably associated therewith, and including solenoid means for initiating engagement of said brake hub with said brake reaction plate, and further including sensing means for indicating when said brake hub has become engaged with said brake reaction plate by action of said trip means or said solenoid means.

10. The failure protection unit of claim 8 wherein said centrifugal response means includes a flyball mechanism radially outwardly of said plunger, said flyball mechanism including a plurality of pockets defined by a driving plate rotationally driven by said input shaft, and further including a spring biased output plate normally rotationally driven by a flyball confined in each of said pockets defined by said driving plate.

11. The failure protection unit of claim 10 wherein said flyball mechanism includes an axial sleeve disposed about said plunger, said output plate extending generally radially of said sleeve and including a ramped surface at the radial outward extreme thereof, and further including a flyball spring disposed about said plunger to act against said axial sleeve for biasing said output plate toward said driving plate.

12. The failure protection unit of claim 11 wherein said pockets are further defined by a plurality of generally radial walls integral with said driving plate, said pockets being still further defined by a circumferential wall at the radial innermost extent thereof, said radial walls for each of said pockets being generally parallel and being generally coextensive and integral with said circumferential wall.

13. The failure protection unit of claim 12 wherein said radial walls each include an angled surface at the radial outward extreme thereof, said ramped surface of said output plate being generally parallel to and coextensive with said angled surface of said radial walls, said .ramped surface of said output plate and said angled surface of said radial walls extending away from said axial sleeve and generally toward said driving plate.

14. The failure protection unit of claim 12 wherein said detent means includes a plurality of detent balls normally disposed in a ball-containing recess in said plunger, said axial sleeve having a ball-receiving recess in an inner surface thereof confronting said plunger, said ball receiving recess normally being axially offset from said detent balls whereby said detent balls are maintained in said ball-containing recess in said plunger.

15. The failure protection unit of claim 14 including an axially fixed sleeve intermediate said plunger and said axial sleeve of said flyball mechanism, said axially fixed sleeve also having a ball-containing recess within which said detent balls of said detent means are normally disposed, said ball-containing recess of said axially fixed sleeve normally being in alignment with said ball-containing recess in said plunger, when said brake hub is locked against engagement with said brake reaction plate by said movement resisting means, and said ball-containing recess of said axially fixed sleeve being in alignment with said ball-receiving recess of said axial sleeve when said movement resisting means is disengaged.

16. A failure protection unit for a flight control system, comprising:

an input shaft connected to a shaft of said flight control system, said shaft of said flight control system normally being operably associated with a plunger having a brake hub integral therewith for rotational driven movement of said plunger and said brake hub through said input shaft, said plunger and said brake hub being axially moveable relative to said input shaft;

a brake reaction plate mounted to be normally stationary within a housing in normally axially spaced relation to said brake hub;

spring means biasing said brake hub in a direction axially toward said brake reaction plate and said plunger in a direction axially away from said input shaft;

means normally resisting axial movement of said brake hub toward said brake reaction plate and axial movement of said plunger away from said input shaft comprising detent means including a plurality of detent balls normally at least partially disposed in a ball-containing recess in said plunger for locking said plunger relative to said housing;

trip means for initiating axial engagement of said brake hub with said brake reaction plate, said trip means being responsive to an overspeed condition for said shaft of said flight control system to disable said movement resisting means to thereby allow said spring biasing means to cause axial movement of said brake hub toward said brake reaction plate and axial movement of said plunger away from said input shaft, said trip means including centrifugal response means operably associated with said movement resisting means;

said centrifugal response means including a flyball mechanism radially outwardly of said plunger having a plurality of radial pockets defined by a driving plate, said driving plate being rotationally driven by said input shaft, and a spring biased output plate normally rotationally driven by a flyball confined in each of said pockets defined by said driving plate;

said flyball mechanism including an axial sleeve disposed about said plunger and said output plate extending generally radially of said sleeve, said output plate including a ramped surface at the radial outward extreme thereof, and a flyball spring disposed about said plunger to act axially against said axial sleeve for biasing said output plate axially toward said driving plate;

said axial sleeve having a ball-receiving recess in an inner surface thereof confronting said plunger and normally axially offset from said detent balls of said detent means whereby said detent balls of said detent means are normally maintained in Said ball-containing recess in said plunger; and means for resetting said brake hub in normally axially spaced relation to said brake reaction plate.

17. The failure protection unit of claim 16 wherein said brake reaction plate includes elastomeric shock absorbing means operably associated therewith, and including solenoid means for initiating engagement of said brake hub with said brake reaction plate, and further including sensing means for indicating when said brake hub has become engaged with said brake reaction plate by action of said trip means or said solenoid means.

18. The failure protection unit of claim 16 wherein said flyball mechanism includes an axial sleeve disposed about said plunger, said output plate extending generally radially of said sleeve and including a ramped surface at the radial outward extreme thereof, and further including a flyball spring disposed about said plunger to act against said axial sleeve for biasing said output plate toward said driving plate.

19. The failure protection unit of claim 18 wherein said pockets are further defined by a plurality of generally radial walls integral with said driving plate, said pockets being still further defined by a circumferential wall at the radial innermost extent thereof, said radial walls for each of said pockets being generally parallel and being generally coextensive and integral with said circumferential wall.

20. The failure protection unit of claim 19 wherein said radial walls each include an angled surface at the radial outward extreme thereof, said ramped surface of said output plate being generally parallel to and coextensive with said angled surface of said radial walls, said ramped surface of said output plate and said angled surface of said radial walls extending away from said axial sleeve and generally toward said driving plate.

21. The failure protection system of claim 18 including an axially fixed sleeve intermediate said plunger and said axial sleeve of said flyball mechanism, said axially fixed sleeve also having a ball-containing recess within which said detent balls of said detent means are normally disposed, said ball-containing recess of said axially fixed sleeve normally being in alignment with said ball-containing recess in said plunger.

22. The failure protection system of claim 21 wherein said detent means includes means normally biasing said detent balls radially outwardly, said biasing means normally forcing said detent balls into engagement with an inner surface of said axial sleeve of said flyball mechanism, said biasing means forcing said detent balls into said ball receiving recess of said axial sleeve when said axial sleeve acts against said flyball spring to move axially.

23. The failure protection system of claim 16 wherein said brake hub and said brake reaction plate each have a plurality of teeth having a negative rake which are disposed in confronting relation for positive engagement thereof, and including an elastomeric torsional shock absorber integrally associated with said brake reaction plate in engagement with said housing to cushion engagement and cause deceleration to a controlled stop.

24. A failure protection unit for a flight control system, comprising:

rotary input means operatively associated with a shaft of said flight control system, said rotary input means also being operably associated with a rotary brake means for rotational driven movement thereof through said rotary input means, said rotary brake means being moveable relative to said rotary input means;

a normally stationary brake means in normally spaced relation to said rotary brake means;

means biasing said rotary brake means in a direction toward said normally stationary brake means;

movement resisting means for locking said rotary brake means in said normally spaced relation to said normally stationary brake means; and centrifugal force responsive means for initiating engagement of said rotary brake means with said normally stationary brake means in an overspeed condition for said shaft of said flight control system by disabling said movement resisting means to thereby allow said biasing means to cause said rotary brake means to move toward said normally stationary brake means for engagement therewith.

25. The failure protection unit of claim 24 wherein said centrifugal force responsive means includes a centrifugal flyball mechanism having a driving plate with a plurality of pockets, an output plate with a ramped surface confronting said pockets, and a flyball disposed in each of said pockets.

26. The failure protection unit of claim 25 wherein said movement resisting means includes a detent mechanism normally locking said rotary brake means against movement relative to said shaft of said flight control system in a direction toward said normally stationary brake means.

27. The failure protection unit of claim 26 wherein said centrifugal flyball mechanism includes means for tripping said detent mechanism to allow said rotary brake means to move toward said normally stationary brake means at a predetermined overspeed condition for said shaft of said flight control system.

* * * * *